(12) United States Patent
Ramesh et al.

(10) Patent No.: US 6,658,050 B1
(45) Date of Patent: Dec. 2, 2003

(54) CHANNEL ESTIMATES IN A CDMA SYSTEM USING POWER CONTROL BITS

(75) Inventors: Rajaram Ramesh, Cary, NC (US); Yi-Pin Eric Wang, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/151,713

(22) Filed: Sep. 11, 1998

(51) Int. Cl.[7] ............................. H04B 1/38; H04C 5/16
(52) U.S. Cl. .................. 375/219; 375/316; 370/491; 370/500
(58) Field of Search ................. 375/200, 267, 375/295, 130, 140, 141, 142, 144, 146, 148, 150, 152, 367; 370/203, 335, 503, 507, 508, 509, 510, 512, 513, 515, 500, 491; 455/69, 572

(56) References Cited

U.S. PATENT DOCUMENTS

| | | | | |
|---|---|---|---|---|
| 5,414,734 A | * | 5/1995 | Marchetto et al. | 375/267 |
| 5,465,276 A | | 11/1995 | Larsson et al. | |
| 5,469,471 A | | 11/1995 | Wheatley | |
| 5,485,486 A | * | 1/1996 | Gilhousen et al. | |
| 5,519,730 A | * | 5/1996 | Jasper et al. | 375/260 |
| 5,590,409 A | * | 12/1996 | Sawahashi et al. | 455/69 |
| 5,604,730 A | * | 2/1997 | Tiedemann, Jr. | 370/252 |
| 5,629,934 A | * | 5/1997 | Ghosh et al. | 370/335 |
| 5,652,765 A | * | 7/1997 | Adachi et al. | 375/211 |
| 5,812,542 A | * | 9/1998 | Bruckert et al. | 370/335 |
| 5,812,938 A | * | 9/1998 | Gilhousen et al. | 455/69 |
| 5,815,801 A | * | 9/1998 | Hamalainen et al. | 455/63 |
| 5,896,411 A | * | 4/1999 | Ali et al. | 375/200 |
| 6,088,324 A | * | 7/2000 | Sato | 370/203 |
| 6,097,972 A | * | 8/2000 | Saaints et al. | 455/572 |
| 6,359,938 B1 | * | 3/2002 | Keevill et al. | 375/316 |

FOREIGN PATENT DOCUMENTS

| | | |
|---|---|---|
| EP | 0674451 | 9/1995 |
| WO | 9524773 | 9/1995 |

OTHER PUBLICATIONS

Wen-yi Kuo et al, "Designs for Pilot-Symbol-Assisted Burst-Mode Communications with Fading and Frequency Uncertainty", *International Journal of Wireless Information Networks*, vol. 1, No. 4, 1994, pp. 239–252.

* cited by examiner

Primary Examiner—Jean B. Corrielus
(74) Attorney, Agent, or Firm—Coats & Bennett, P.L.L.C.

(57) ABSTRACT

A transceiver transmits signals with power control bits, the power control bits instructing the other transceiver to establish selected power levels for its return signal. In one form, a processor is adapted to determine channel coefficients for the pilot symbols as a function of both (1) the selected power levels of the other transceiver signal and (2) the difference between the predetermined pilot symbols and the pilot symbols as received by the receiver. The processor then interpolates channel coefficients for all symbols in the received signals based on the determined pilot symbol channel coefficients. In an alternate form, the processor uses a selected auto-correlation function which takes into account the selected power levels of the other transceiver signal to calculate an interpolation filter. In this alternate form, the processor then uses the calculated interpolation filter and channel coefficients for the pilot symbols to interpolate channel coefficients for symbols between the pilot symbols. A demodulator demodulates all received symbols based on the interpolated channel coefficients.

26 Claims, 2 Drawing Sheets

CHANNEL ESTIMATES IN A CDMA SYSTEM USING POWER CONTROL BITS

BACKGROUND OF THE INVENTION

1. Technical Field

The present invention is directed toward improving output of cellular communication units, and more particularly toward improving the quality of channel estimates used to convert received signals to usable output in cellular communication units.

2. Background Art

Signals for wireless systems are subjected to varying conditions which can degrade the signal received by the mobile units or mobile stations ("MS") using the system. Such conditions can also degrade the signal received by base transceiver stations ("BTS") from mobile stations.

For example, MS and BTS can receive signals from multiple directions (e.g., a specific signal can be received by an MS directly from a BTS, and reflected off of many different ground objects), with the varying signal sources potentially being out of phase and thereby tending to cancel each other out to some degree, reducing signal strength. Such signal fading, generally known as Rayleigh fading, occurs spatially over the area of the system, with specific areas potentially having significant fading which could cause the mobile unit to lose the signal entirely.

The net result of such factors is that the signal which is transmitted by the transmitter (e.g., a cell tower) will be distorted by the time it reaches the receiver (e.g., a cellular telephone). In a cellular telephone call, for example, this can result in distortion objectionable to the ear, or even a lost signal.

In order to account for this distortion, channel estimates have been used to determine the signal distortion at known pilot symbols in the data bursts and channel coefficients (correction factors used to derive channel estimates) at other symbols in the data bursts have been interpolated based on the channel estimates at the pilot symbols. As an example, data bursts have been transmitted in the IS-136 System with 162 symbols, each symbol comprising two bits. In a proposed extension of the IS-136 System, the data bursts of 162 symbols at predetermined, known locations $P_i$ in the data bursts are predetermined, known pilot symbols $S_{Pi}$ (where i=1 to n, n being the number of pilot symbols used). In the proposed extension of the IS-136 System, each symbol contains three bits.

The channel coefficients determined from the pilot symbols have been used to estimate the most likely value for each data symbol in a data burst. That is, the channel coefficients determined from the pilot symbols have been interpolated to determine the channel coefficients at the other symbols (i.e., data symbols) in the data burst by using an interpolator or filter suited to work under the conditions most likely to be encountered by the communication unit.

A more detailed discussion of the prior art use of channel estimates is included below in context with the Description of the Preferred Embodiment. While such prior art channel estimates have enabled the received signal to be more accurately demodulated to provide improved output, such channel estimates are still susceptible to error and resulting degradation of the output.

The present invention is directed toward overcoming one or more of the problems set forth above.

SUMMARY OF THE INVENTION

In one aspect of the present invention, a transceiver adapted to communicate via signals with another transceiver is provided. The one transceiver includes a receiver adapted to receive from the other transceiver a signal having multiple symbols therein including predetermined pilot symbols, and a transmitter adapted to transmit signals having multiple symbols therein including power control bits, the power control bits instructing the other transceiver to establish selected power levels for its signal to the receiver. The transceiver also includes a processor adapted to interpolate channel coefficients for received symbols as a function of both (1) the selected power levels of the other transceiver signal and (2) the difference between the predetermined pilot symbols and the pilot symbols as received by the receiver. A demodulator demodulates all received symbols based on the interpolated channel coefficients.

In one preferred form, pilot symbol channel coefficients $C_{Pi}$ are determined by the processor so as to minimize the following summation for selected pilot symbols:

$$\Sigma E\{|R_{Pi} - C_{Pi} * S_{Pi} * \sqrt{W_{Pi}}|^2\}$$

where: E is the expectation value for the power level at pilot position $P_i$, $W_{Pi}$ is the known power level at pilot position $P_i$, $R_{Pi}$ is the pilot symbol as received at pilot position $P_i$, and $S_{Pi}$ is the pilot symbol known to have been sent at pilot position $P_i$.

With this form, the processor includes an interpolation filter which interpolates channel coefficients for other than the pilot symbol channel coefficients based on the determined pilot symbol channel coefficients $C_{Pi}$.

In a second preferred form, the processor is adapted to calculate an interpolation filter as a function of the selected power levels, and channel coefficients for received symbols other than the pilot symbols are interpolated using the calculated interpolation filter.

In this second preferred form, when the transceiver is subjected to conditions in which the power levels can be set accurately and the power control bits will be received correctly by the other transceiver, the processor uses the following auto-correlation function $R_c$, in calculating the interpolation filter:

$$R_{c|W_i W_k}(i,k) = \sqrt{W_i} \sqrt{W_k} J_o(2\pi f_d(i-k)T_s)$$

where: $J_O$ is the Bessel function of the first kind;

$f_D$ is the Doppler spread of the channel;

$T_s$ is the symbol duration, and $W_i$ and $W_k$ are known power levels at positions i and k in the received signal.

Alternatively, in this second preferred form, when the transceiver is subjected to conditions in which the power control bits are always received correctly and changes in the power level are independent and identically distributed, the-processor uses the following auto-correlation function $R_c$, in calculating the interpolation filter:

$$R_{c'(i,k)|y_1,y_2,\ldots,y_L} = E[W_i] E[\sqrt{s_1}]^{y_1,y_2,\ldots,y_L} J_o(2\pi f_D(i-k)T_s)$$
$$= AE[\sqrt{s_1}]^{y_1,y_2,\ldots,y_L} J_o(2\pi f_D(i-k)T_s)$$

where: $J_O$ is the Bessel function of the first kind;

$f_D$ is the Doppler spread of the channel;

$T_s$ is the symbol duration;

i and k are positions in the received signal;

$P_i$ is the known power level at position i in the received signal;

$s_1$, is the incremental change in signal power resulting from a non-zero power control bit;

$y_i$ is either 1 or −1, where at position k there have been L incremental power steps;

E is expectation;

$W_i$ is the known power level at positions i of the received signal; and

A is the average power level of the received signal.

In another alternative of the second preferred, form, when the transceiver is subjected to conditions in which the transmitted power control bits are received by the other transceiver with very poor signal to noise ratio (SNR) and incremental changes in the power level of the received signal are accurate, the processor uses the following auto-correlation function $R_{c'}$ in calculating the interpolation filter:

$$R_{c'}(i,k) = AJ_0(2\pi f_D(i-k)T_s)\left(\frac{\sqrt{s}+\sqrt{s}^{-1}}{2}\right)^L$$

where: $J_O$ is the Bessel function of the first kind;

$f_D$ is the Doppler spread of the channel;

$T_s$ is the symbol duration;

i and k are positions in the received signal;

s is the incremental change $\Delta W_i$ in signal power resulting from a non-zero power control bit;

L is the number of incremental power steps; and

A is the average power level of the received signal.

In still another alternative of the second preferred form, when the transceiver is subjected to conditions in which the power control bits are received with poor signal to noise ratio (SNR) and incremental changes in the power level of the received signal are not accurate, the processor uses the following auto-correlation function $R_{c'}$ in calculating the interpolation filter:

$$R_{c'}(i,k) = AJ_0(2\pi f_D(i-k)T_s)\left(\frac{E[\sqrt{s}]+E[\sqrt{s}^{-1}]}{2}\right)^L$$

where: $J_O$ is the Bessel function of the first kind;

$f_D$ is the Doppler spread of the channel;

$T_s$ is the symbol duration;

i and k are positions in the received signal;

s is the incremental change in signal power resulting from a non-zero power control bit;

L is the number of incremental power steps;

E is expectation; and

A is the average power level of the received signal.

In another aspect of the first form of the present invention, a transceiver is adapted to communicate via signals with another transceiver, and includes a receiver, transmitter and processor. The receiver is adapted to receive from the other transceiver a signal having multiple symbols therein including predetermined pilot symbols. The transmitter is adapted to transmit signals having multiple symbols therein including power control bits, the power control bits instructing the other transceiver to establish selected power levels for its signal to the receiver. The processor is adapted to (a) determine channel coefficients for the pilot symbols as a function of both (1) the selected power levels of the other transceiver signal and (2) the difference between the predetermined pilot symbols and the pilot symbols as received by the receiver, (b) interpolate channel coefficients for received symbols other than the pilot symbols based on the channel coefficients determined for the pilot symbols, and (c) demodulate all received symbols based on the interpolated channel coefficients.

The one transceiver may be a base station and the other transceiver a mobile station of a cellular telephone system, or vice versa.

In a preferred construction of this aspect of the first form of the present invention, the pilot symbol channel coefficients $C_{Pi}$ are determined so as to minimize the following summation for selected pilot symbols:

$$\Sigma E\{|R_{Pi}-C_{Pi}*S_{Pi}*\sqrt{W_{Pi}}|^2\}$$

where: E is the expectation value for the power level at pilot position $P_i$, $W_{Pi}$ is the known power level at pilot position $P_i$, $R_{Pi}$ is the pilot symbol as received at pilot position $P_i$, and $S_{Pi}$ is the pilot symbol known to have been sent at pilot position $P_i$.

In another preferred embodiment of this aspect of the first form of the present invention, the processor includes an interpolation filter, and the interpolation filter uses the determined channel coefficients for the pilot symbols to interpolate the channel coefficients for received symbols other than the pilot symbols.

In still another aspect of the first form of the present invention, a transceiver is adapted to communicate with another transceiver via signals having multiple symbols therein, where the one transceiver adapted to transmit outgoing signals with power control bits instructing the other transceiver to establish selected power levels in its signal and the other transceiver adapted to transmit return signals to the one transceiver at the selected power levels with symbols including predetermined pilot symbols. The one transceiver includes a transmitter adapted to transmit the outgoing signals, a receiver adapted to receive the return signals from the other transceiver, memory storing the predetermined pilot symbols, and a processor. The processor is adapted to (a) determine channel coefficients for the pilot symbols as a function of both (1) the selected power levels of the other transceiver signal and (2) the difference between the predetermined pilot symbols stored in the memory and the pilot symbols as received by the receiver, (b) interpolate channel coefficients for symbols in the based on channel coefficients determined for the pilot symbols, and (c) demodulate received symbols based on the interpolated channel coefficients.

The above described alternates and preferred constructions of the first form of the present invention may also be used with this aspect of the first form of the present invention.

In another aspect of the second form of the present invention, a unit for communicating with a transceiver which transmits return signals in data bursts having data symbols and predetermined pilot symbols in a plurality of slots is provided, including a transmitter adapted to send outgoing signals in data bursts to the transceiver, the data bursts of the outgoing signals having a plurality of slots including data symbols comprising power control bits instructing the transceiver on the power to use when transmitting a return signal back to the unit, and a receiver adapted to receive a return signal from the transceiver. The unit also includes a memory storing (a) the predetermined pilot symbols, (b) an auto-correlation function based at least in part upon the power levels of the return signal when transmitted by the transceiver, and (c) an algorithm for calculating an interpolator based on the auto-correlation function. A comparator is adapted to determine the difference between the pilot symbols in the return signal as received by the receiver and the predetermined pilot symbols in the memory. The units further includes a processor adapted to determine channel coefficients for the received pilot symbols based on the difference determined by the comparator, use the algorithm to calculate an interpolation filter, and use the interpolation filter and the determined pilot symbol channel coefficients to derive data symbols in the received return signal. A unit demodulator is adapted to demodulate derived data symbols, and an output is adapted to receive symbols demodulated by the processor.

The unit may be a base station and the transceiver a mobile station of a cellular telephone system, or vice versa.

The above described alternates of the second form of the invention, including the use of different auto-correlation functions based on different conditions, may also be used with this aspect of the second form of the present invention.

In still another aspect of the second form of the present invention, a transceiver adapted to communicate via signals with another transceiver is provided. The one transceiver includes a receiver adapted to receive from the other transceiver a signal having multiple symbols therein including predetermined pilot symbols, and a transmitter adapted to transmit signals having multiple symbols therein including power control bits, the power control bits instructing the other transceiver to establish selected power levels for its signal to the receiver. The transceiver also includes a processor adapted to (a) calculate an interpolation filter based on the selected power levels of the other transceiver signal, (b) use the calculated interpolation filter to interpolate channel coefficients for received symbols other than the pilot symbols based on the difference between the predetermined pilot symbols and the pilot symbols as received by the receiver, and (c) demodulate all received symbols based on the interpolated channel coefficients.

The above described alternates of the second form of the invention, including the use of different auto-correlation functions based on different conditions to calculate the interpolation filter, may also be used with this aspect of the second form of the present invention.

In still another aspect of the present invention, a method for improving the signal reception of a communication unit is provided, comprising the steps of (a) transmitting a signal from a first transceiver with data symbols, selected ones of the data symbols having power control bits instructing a second transceiver to send a return signal at selected power levels; (b) receiving the transmitted signal at the second transceiver; (c) transmitting a return signal from the second transceiver with data symbols and pilot symbols, the pilot symbols having predetermined values at predetermined locations in the signal; (d) receiving the return signal at the first transceiver; (e) determining the return signal data symbols based at least in part on the instructions of the power control bits regarding the power level of the return signal; and (f) outputting the received signal using the data symbols corrected in step (e).

The first form of the invention may be used with this aspect of the present invention, with step (e) comprising (e1) determining correction factors at the predetermined locations of the pilot symbols in the return signal based on both (1) a comparison of the pilot symbols as received by the first transceiver with the predetermined values of the pilot symbols and (2) the instructions of the power control bits regarding the power level of the return signal, (e2) interpolating correction factors for data symbols based on the correction factors for the pilot symbols determined in step (e1), and (e3) correcting the received return signal data symbols using the correction factors interpolated in step (e2).

In a preferred alternate of this first form of the invention, correction factors $C_{Pi}$ are determined in step (e1) by minimizing the following summation for selected pilot symbols:

$$\Sigma E\{|R_{Pi} - C_{Pi} * S_{Pi} * \sqrt{W_{Pi}}|^2\}$$

where: E is the expectation value for the power level at pilot position $P_i$, $W_{Pi}$ is the known power level at pilot position $P_i$, $R_{Pi}$ is the pilot symbol as received at pilot position $P_i$, and $S_{Pi}$ is the pilot symbol known to have been sent at pilot position $P_i$.

The second form of the invention may also be used with this aspect of the present invention, with step (e) comprising (e1') calculating an interpolation filter based at least in part on the selected power levels of the return signal, (e2') determining correction factors for the pilot symbols, (e3') interpolating correction factors for received return signal data symbols using the calculated interpolation filter and the determined pilot symbol correction factors, and (e4') using the interpolated correction factors to determine the return signal data symbols.

In a preferred alternate of this second form of the invention, the calculating of step (e1') uses an auto-correlation function which is based in part on the selected power levels of the return signal.

It is an object of the present invention to provide improved signal interpolation for a communication system such as a cellular telephone system.

DESCRIPTION OF THE PREFERRED EMBODIMENT

The preferred embodiment of the present invention is illustrated in the Figures.

Figure 1:
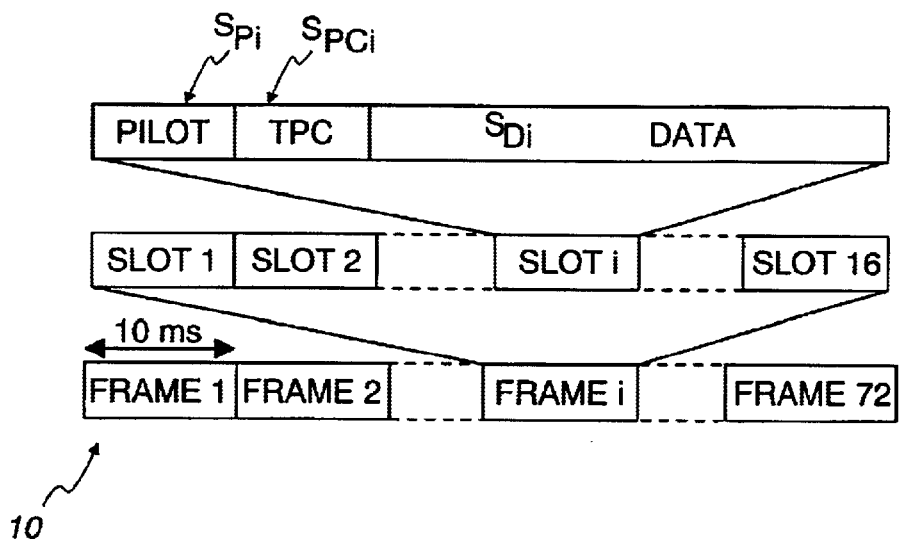
FIG. 1 is a schematic illustration of a data burst in a signal transmitted by the improved transceiver of the present invention.

FIG. 1 illustrates a data burst 10 such as is typically used in a downlink in a WCDMA ("Wideband Code-Division Multiple Access") system. The signal includes a number of frames (e.g., seventy-two frames), each frame including a number of slots (e.g., sixteen slots), and each slot including a number of symbols. For example, slot i includes a pilot symbol $S_{Pi}$, a power control bit or symbol $S_{PCi}$, and a plurality of data symbols $S_{Di}$. It should be recognized, however, that each of these symbols could comprise more than one symbol (for example, pilot symbol $S_{Pi}$ may be one or more symbols as is known in the art for various types of systems). Further, it should be recognized that the illustrated data burst 10 is merely exemplary, and the present invention could be used with data bursts having different numbers and types of frames, slots and symbols so long as pilot symbols and power control symbols are used.

Power control bits $S_{PCi}$ are used in WCDMA receivers operating in the closed-loop power control mode to control the power of the return transmitted signal. Again, it should be recognized that the data burst 10 shown is for illustration purposes only, and individual slots could contain more or less than one power control symbol $S_{PCi}$, and could (and preferably do) contain multiple data symbols $S_{Di}$ (such symbols being just generally referred to herein as $S_{Di}$, where i is generally used to refer to positions in the data burst 10).

Thus, for example, in accordance with the present invention, power control signals $S_{PCi}$ are included in the data burst sent by a BTS to an MS to increase the power of the MS transmissions where the BTS sees that the signal that it is receiving from the MS is low power (for example, if the MS is on the outer edge of the coverage area of the BTS), and would include a power control signal $S_{PCi}$ in its data burst to an MS to decrease the power of its transmissions where the BTS sees that the signal that it is receiving has more than adequate power (for example, if the MS is next to the BTS with little interference with its signal, or if the MS transmission is so strong as to interfere with other signals). Such power control assists in minimizing power use (and thereby maximizing battery life in a MS) while simultaneously ensuring reliable receipt of transmissions by minimizing co-channel interference seen by other users. As a typical example in WCDMA systems, power control symbols $S_{PCi}$ tell the receiver to incrementally increase or decrease the power of the signal which the associated transmitter sends by 1 dB (of course, other incremental dB changes could also be used as selected for the system). In many systems, such as WCDMA, IS-95 and CDMA 2000, the power control symbols $S_{PCi}$ are not zero. However, it should be understood that it would be within the scope of the present invention to use this invention with systems in which power control bits could be zero, that is, power control symbols $S_{PCi}$ are included at known locations in the data burst but allow the other transceiver to continue transmitting at its current power level.

The present invention makes advantageous use of these power control signals which, as already noted, are not new. Of course, since power control signals are already used in some prior art systems (e.g., IS-95 and WCDMA systems), the above requires no change in the signals currently sent and, as will become clear from the further description below, will allow use of the present invention with no change to the systems. If power control signals are added to other systems, this invention can, of course, then be readily used with those systems as well.

In the description herein, the power control symbols are described as being in the data bursts sent out by the BTS and that information is also used according to the invention to assist in interpreting the signal received by the BTS from the MS. However, it should be understood that the present invention can be and preferably is conversely used to advantage as well, with the MS signaling the BTS regarding the power to be used in the BTS signal and the MS using that information to assist in interpreting the signal received by the MS from the BTS. It should therefore be understood that, in accord with the present invention and with this convention (i.e., to assist in BTS interpretation of received signals), pilot symbols would not necessarily be required in the data burst sent out by the BTS (though they would still be highly preferred to assist in conventional interpretation of signals received by the MS), and power control symbols would not necessarily be required in the data burst sent out by the MS (though they would also be highly preferred to minimize co-channel interference resulting from BTS signals). Of course, taking full advantage of the present invention in assisting signal interpretation at both the MS and BTS would entail transmitting data bursts such as shown in FIG. 1 (including both pilot symbols $S_{Pi}$ and power control signals $S_{PCi}$) by both the MS and the BTS.

Figure 2:
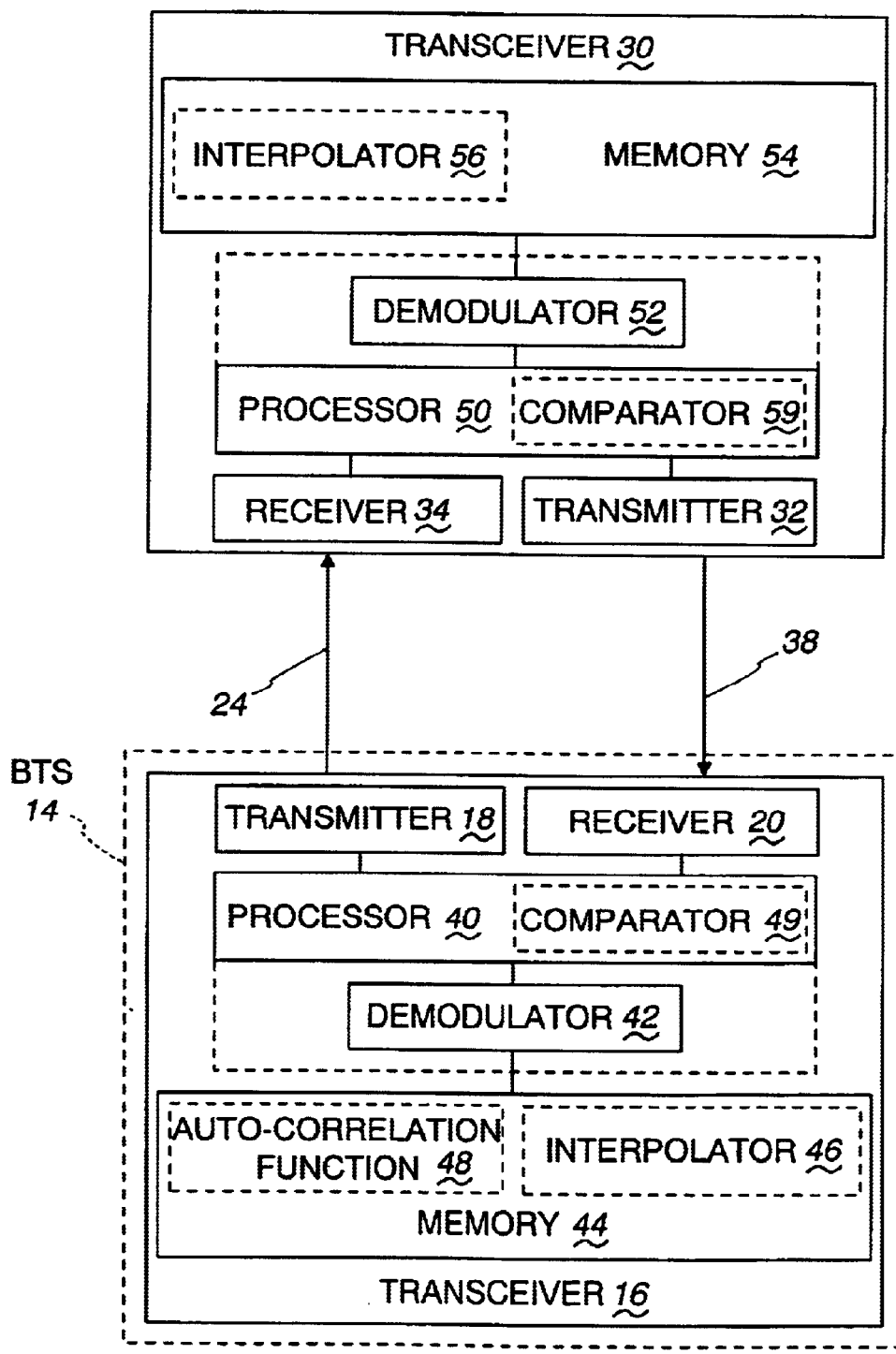
FIG. 2 is a schematic illustration of a communication system including a mobile communication unit embodying the present invention.

As illustrated in FIG. 2, the BTS 14 includes a transceiver 16 (including a transmitter 18 and receiver 20) which transmits signals 24 including data bursts 10 to other transceivers 30 (each including a transmitter 32 and receiver 34). The other transceivers 30 could be, for example, in a mobile communication unit or mobile station [MS] such as a cellular telephone. Similarly the MS transceiver 30 send back signals 38 with data bursts to the BTS transceiver 16/receiver 20. The signals 24, 38 are sent at a selected frequency within a bandwidth appropriated for signals between the transmitter 18 and MS transceiver 30. In IS-95 systems this bandwidth is typically about 1.25 MHz, and in WCDMA systems the bandwidth is typically about 5 MHz.

In the prior art, the pilot symbols $S_{Pi}$ in the data bursts between the transceivers 16, 30 are used to correct for variations in channel conditions along the data bursts 10 causing signal degradation. That is, known pilot symbols $S_{Pi}$, are provided at known positions within the data burst 10. The receiving transceiver 16 or 30 compares the received symbol $R_{Pi}$ which it receives at those known positions with the known, symbols $S_{Pi}$ and determines an appropriate factor or channel coefficient $C_{Pi}$ for each pilot position $P_i$ to correct for that signal degradation. For example, if the symbol at $P_i$ is known to have been transmitted as $S_{Pi}$, and the communication unit actually receives $R_i$ at $P_i$, $C_{Pi}$ may be determined during the channel estimation process so that:

$$\Sigma |R_{Pi} - C_{Pi} * S_{Pi}|^2 \qquad (1)$$

is minimized, where the summation reflects the difference between the received symbol and the corrected symbol known to have been transmitted for a selected group of pilot symbols (the minimized summation therefore reflecting a group of channel coefficients $C_{Pi}$ for i number which seem to provide the most accurate correction).

The channel coefficients $C_{Pi}$ determined for the selected positions of the pilot symbols along the data burst are used in the prior art to determine appropriate channel coefficients $C_{Pi}$ for all symbol positions along the data burst 10 by suitable interpolation. Specifically, interpolation to determine appropriate correction factors $C_i$ for all data symbols $S_{Di}$ between the pilot symbols $S_{Pi}$ is preferably done by use of an appropriate interpolator or Weiner filter such as is known in the art, and as explained in "Designs for Pilot-Symbol-Assisted Burst-Mode Communications with Fading and Frequency Uncertainty", by Wen-yi Kuo and Michael P. Fitz, *International Journal of Wireless Information Networks*, Vol. 1, No. 4, 1994, pp. 239–252, the complete disclosure of which is hereby fully incorporated by reference. However, once a full understanding of the present invention is obtained, it will be recognized that the present invention may be advantageously used with virtually any interpolator suited for use in a cellular telephone system with which the present invention is also used.

Also according to the prior art, the interpolated $C_i$ at each symbol position along the data burst 10 is then used to demodulate the symbols in the burst 10. For example, at symbol number 20 (where i=20) in the data burst, a factor $C_{20}$ is interpolated as discussed above. The proper symbol may then be determined by calculating which signal $S_{20J}$ results in the least "metric" or error factor $m_{20}$ at position 20 according to the following:

$$m_{20} = |R_{20} - C_{20} * S_{20J}|^2, \text{ where:}$$

$R_{20}$ is the symbol received at position 20; and $S_{20J}$ are the hypothetical possible symbols at position 20 (where, for example, there are four possible discrete values for symbols [i.e., four possible waveforms, J being 1 to 4] when modulation is QPSK [Quadrature Phase Shift Keying] and there are eight possible symbols [i.e., J is 1 to 8] when modulation is 8-PSK [8 Phase Shift Keying]).

According to one manner of prior art channel estimating, whichever of the discrete J number of symbols $S_{20J}$ gives the lowest $m_{20}$ is used as the most likely symbol for position 20, which symbol is used in demodulating the data burst 10.

The present invention is directed to improving the accuracy of the channel coefficients $C_{Pi}$ for the pilot symbols to thereby improved the accuracy of the channel coefficients $C_i$ for the data symbols derived by interpolation using the channel coefficients, to thereby ultimately improve the accuracy and therefore quality of the demodulated signal.

Specifically, the present invention as detailed below is adapted to provide more accurate channel coefficients $C_i$ for each symbol $S_i$ in the received data burst 10 by making use of the knowledge of the power of the received signal derived from the power control symbols sent by the receiving transceiver. Since the BTS is able to determine the relative transmission power of the signal which is received from the MS (by virtue of the BTS itself having sent out power control symbols instructing the MS on power levels to use), in accordance with the present invention the determination of the channel coefficients $C_{Pi}$ for the pilot symbols $S_{Pi}$ is done based not only on the difference between the pilots symbol as received versus the predetermined pilot symbols known to have been transmitted, but also based on the known power of the transmitted signal.

Figure 3:
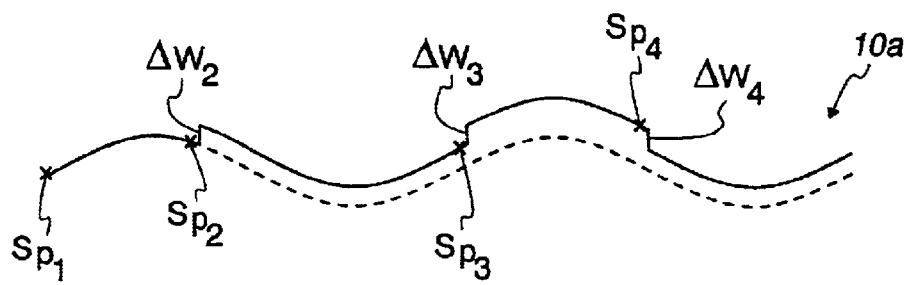
FIG. 3 is a greatly simplified graphic illustration of the complex data burst of a signal.

This concept is illustrated in FIG. 3, which is a greatly simplified graphic illustration of the complex data burst 10a of a signal. If the BTS signal instructed the MS to send this data burst 10a with the power at slot 2 increasing by $\Delta W_2$, the power at slot 3 increasing by $\Delta W_3$, and the power at slot 4 decreasing by $\Delta W_4$, it can be seen from the illustration that any interpolation of the actual signal (represented by the solid line) between the pilot symbols $S_{Pi}$ would be only a crude approximation of the signal. According to the present invention, the BTS uses knowledge of the $\Delta W_i$ to adjust for the $\Delta W_i$ so that interpolation is made along the dashed line which more accurately represents relation of the pilot symbols $S_{Pi}$ to one another in the data burst.

Accordingly, in one form the present invention provides a more accurate channel coefficient $C_{Pi}$ as determined at the positions of the pilot symbols $S_{Pi}$ in order to provide more accurate channel coefficients as interpolated therebetween ($C_i$ at each symbol position) from those pilot symbol channel coefficients $C_{Pi}$. These more accurate channel coefficients $C_{Pi}$ are used by a suitable interpolation filter to thereby provide more accurate channel coefficients $C_i$ for all data symbols $S_{Di}$ in the data burst 10. As previously noted, interpolation filters are illustrated, for example, in "Designs for Pilot-Symbol-Assisted Burst-Mode Communications with Fading and Frequency Uncertainty", by Wen-yi Kuo and Michael P. Fitz, *International Journal of Wireless Information Networks*, Vol. 1, No. 4, 1994, pp. 239–252.

Thus, in this first form of the present invention, the transmitted power level W is factored in to generate the channel coefficients so that, instead of equation (1) above, channel coefficients $C_{Pi}$ for all the pilot symbols are determined so as to minimize the following sum:

$$\Sigma E\{|R_{Pi} - C_{Pi} * S_{Pi} * \sqrt{W_{Pi}}|^2\} \quad (2)$$

where the pilot symbol at $P_i$ is known to have been transmitted as $S_{Pi}$ at power level $W_{Pi}$ and the communication unit actually receives $R_i$ at $P_i$, and E is the expectation value for the power level $W_{Pi}$ at $P_i$. This minimized summation therefore reflects a group of channel coefficients $C_{Pi}$ of i number which seem to provide the most accurate correction for the group of pilot symbols $S_{Pi}$.

These channel coefficients $C_{Pi}$ are then used in an interpolation filter such as is known in the art to interpolate appropriate channel coefficients $C_i$ for all data symbols $S_{Di}$ between the pilot symbols $S_{Pi}$.

In another form of the present invention, the knowledge of the transmission power level of the received symbols is alternatively used to improve estimation of the channel at the pilot symbols $S_{Pi}$, with that improved estimation used to calculate an interpolation filter best suited to such power level variations. More specifically, as described in greater detail hereafter, the power level information is taken into account in the auto-correlation function $R_{c'}$ used to calculate the best suited interpolation filter (use of auto-correlation functions in calculating interpolation filters is known and shown, for example, in "Designs for Pilot-Symbol-Assisted Burst-Mode Communications with Fading and Frequency Uncertainty", by Wen-yi Kuo and Michael P. Fitz, *International Journal of Wireless Information Networks*, Vol. 1, No. 4, 1994, pp. 239–252). As is known in the art, the auto-correlation function $R_c(i, k)$ is the expectation of $C_i$ ($C_k$) complex conjugate (that is, $R_{c'} = E[C'_i(C'_k)*]$). In accordance with the present invention, the auto-correlation function is designated $R_{c'}$, as channel coefficient C' is, in accord with the present invention, a factor of the true channel coefficient and the square of the power level $W_i$.

In the second form of the invention, channel coefficients are determined for the pilot symbols $S_{Pi}$ in accordance with equation (1) above (i.e., without factoring in knowledge about power level $W_i$ as occurs with the first form of the present invention), and those determined pilot symbol channel coefficients $C_{Pi}$ are used by the calculated "best suited" interpolation filter (which, as stated above, in this form of the invention is based in part on the known power levels) to interpolate reliable channel coefficients for the data symbols $S_{Di}$ of the data burst 10.

In this second form of the invention, the auto-correlation function to use in calculating the best interpolation filter can be dependent upon the conditions to which the system is subjected.

More specifically, in accordance with the above described second form of the present invention, where the communication system (e.g., environmental conditions, equipment reliability, etc.) is such that the power control step can be set accurately and the power control commands will be received correctly (i.e., power levels $W_i$ and $W_k$ of the symbols at positions i and k are reliably known), the auto-correlation function $R_{c'}$ to be used by the BTS is:

$$R_{c'|W_i,W_k}(i,k) = \sqrt{W_i}\sqrt{W_k}J_O(2\pi f_D(i-k)T_s)$$

where: $J_O$ is the Bessel function of the first kind;

$f_D$ is the Doppler spread of the channel; and $T_s$ is the symbol duration.

In a BTS of a system in which the above described conditions are commonly present, this auto-correlation function $R_{c'}$ is advantageously used to calculate an interpolation filter best suited to those conditions expected in that system. The power levels $W_i$ and $W_k$ are, of course, known from the power control symbols $S_{PCi}$ as previously discussed. With the interpolation filter thereby calculated by taking into account more known information than in the prior art (specifically, power level information), the accuracy of the channel coefficients $C_i$ interpolated for all the data symbols $S_{Di}$ will also thereby be improved.

Alternatively, where the communication. system is such that the power control symbols are always received correctly and it can be assumed that the power control steps $\Delta W_i$ are independent and identically distributed (i.e., there is no dependence between the steps), the auto-correlation function $R_{c'}$ to be used in calculating the interpolation filter for the BTS to use is:

$$R_{c'(i,k)|y_1,y_2,\ldots,y_L} = E[W_i]E[\sqrt{s_1}]^{y_1+y_2+\ldots+y_L}J_0(2\pi f_D(i-k)T_s)$$
$$= AE[\sqrt{s_1}]^{y_1+y_2+\ldots+y_L}J_0(2\pi f_D(i-k)T_s)$$

where: $s_1$ is the power control step, or the incremental change $\Delta W_i$ in signal power resulting from a power control bit instruction to change up or down (e.g., 1 dB in the example given earlier)

$y_i$ is either 1 or −1, where at position k there have been L incremental power steps;

E is the expectation value for the power level at $P_i$; and

A is the average signal power.

In a BTS of a system in which the above described conditions are commonly present, this auto-correlation function $R_{c'}$ is advantageously used to calculate an interpolation filter best suited to those conditions expected in that system. With the interpolation filter thereby calculated by taking into account more known information than in the prior art (specifically, power level information), the accuracy of. the channel coefficients $C_i$ interpolated for all the data symbols $S_{Di}$ will also thereby be improved.

As another alternative of this form of the invention, where the communication system is such power control symbols can be commonly expected to be received with very poor signal to noise ratio (SNR) but the power control step is very accurate, the auto-correlation function $R_{c'}$ to be used in calculating the interpolation filter for the BTS to use is:

$$R_{c'}(i,k) = AJ_0(2\pi f_D(i-k)T_s)\left(\frac{\sqrt{s}+\sqrt{s}^{-1}}{2}\right)^L$$

In a BTS of a system in which the above described third conditions are commonly present, this auto-correlation function $R_{c'}$ is advantageously used to calculate an interpolation filter best suited to those conditions expected in that system. With the interpolation filter thereby calculated by taking into account more known information than in the prior art (specifically, power step information), the accuracy of the channel coefficients $C_i$ interpolated for all the data symbols $S_{Di}$ will also thereby be improved.

In yet another alternate of this form of the present invention, suitable where the communication system is such power control symbols can be commonly expected to be received with very poor signal to noise ratio (SNR) and the power control step is not accurate, the-auto-correlation function $R_{c'}$ to be used in calculating the interpolation filter used by the BTS is:

$$R_{c'}(i,k) = AJ_0(2\pi f_D(i-k)T_s)\left(\frac{E[\sqrt{s}]+E[\sqrt{s}^{-1}]}{2}\right)^L$$

As with the above described alternates of this form of the invention, in a BTS of a system in which the above described conditions are commonly present, this auto-correlation function $R_{c'}$ is advantageously used to calculate an interpolation filter best suited to those conditions expected in that system so that the accuracy of the channel coefficients $C_i$ interpolated for all the data symbols $S_{Di}$ will also thereby be improved.

With the most preferred embodiments, a BTS would be programmed to suitably use whichever of the above auto-correlation functions $R_{c'}$ is associated with the conditions most likely to be encountered by that BTS. However, it would be within the scope of the present invention to provide a suitable processor and/or sensors which could, at a given time, determine which of those conditions is then present and then use the auto-correlation function $R_{c'}$ associated with those conditions until a different condition is determined to be present, at which time the BTS would switch to using a different auto-correlation function $R_{c'}$ to calculate the interpolation filter used to interpolate channel coefficients $C_i$ for the data symbols $S_{Di}$.

Further, it should be understood that the broad scope of the present invention could be used with auto-correlation functions different than those set forth above, or adapted to work best with different conditions than above, where such auto-correlation functions use the power level information available from the power control signals $S_{PCi}$.

The BTS and MS transceivers 16, 30 illustrated in FIG. 2 may be operated according to the present invention. Most simply put, in accordance with the preferred embodiment of the present invention, the BTS transceiver 16 includes a processor 40, a signal demodulator 42 and a memory 44. The memory 44 includes a signal interpolator 46.

In the second form of the invention (in which an interpolation filter is calculated by the BTS), the memory 44 also includes at least one auto-correlation function 48 (in the above described alternate in which the conditions are sensed and a suitable auto-correlation function used based on the sensed conditions, the memory 44 would include more than one auto-correlation function). In the second form of the invention, if conditions are not sensed to select between auto-correlation functions, the auto-correlation function 48 should be chosen based on the conditions expected by the transceiver 16. Further, in the second form of the invention, the signal interpolator 46 would not be a specific interpolation filter but rather a suitable algorithm or the like from which the best suited interpolation filter can be calculated based on the auto-correlation function 48 as previously noted.

The memory 44 also includes the known values of the pilot symbols $S_{Pi}$ which are used as a basis for determining the pilot symbol channel estimates. The processor 40 includes a comparator 49 for comparing the known values of the pilot symbols as received to those as received as part of the determination of the pilot symbol channel estimates.

The other transceiver 30 is substantially similar in that it also includes a processor 50, a signal demodulator 52 and a memory 54. The memory 44 also includes a signal interpolator 56 and the processor 50 also includes a comparator 59. (In the convention used herein as previously noted, the BTS 14 sends out the power control bits to the MS and therefore the auto-correlation functions according to the present invention are not required or included in the MS in the FIG. 2 illustration. However, as previously noted, the MS could instead or also operate in the same manner as described of the BTS 14 herein, in which case the MS would include power control bits in its signal 38 and would include in its memory 54 a suitable auto-correlation function such as disclosed herein. Therefore, it should be understood that the MS could also have one or more auto-correlation functions in its memory 54 for use in calculating interpolation filters [using the second form of the invention], and/or could use the power level information in determining the channel coefficient $C_{Pi}$ for the pilot symbols received from the BTS [using the first form of the invention].)

Operation of the transceivers 16, 30 of FIG. 2 is thus as follows. The BTS transceiver 16 generates a signal 24 which is sent out over the air for receipt by an MS. The signal 24 includes data bursts 10 such as shown in FIG. 1, with power control bits determined by the BTS processor 40 instructing the receiving MS as to the power level to use in its return signal 38. The MS processor 50 suitably interpolates and demodulates the signal 24 and, responsive to the demodulated power control bits, controls the power level of the signal 38 it sends to the BTS 14.

According to the first form of the present invention as described above, the BTS processor 40 uses the knowledge in the BTS of the power level of the signal 38 in view of the instructions sent by the BTS, to determine improved channel coefficients $C_{Pi}$ for the pilot symbols $S_{Pi}$ in accordance with equation (2) above. Those improved pilot symbol channel coefficients $C_{Pi}$ are then used by the interpolator 46 to determine improved channel coefficients $C_i$ for all the data symbols. The improved interpolated signal is then demodulated by the demodulator 42 to provide a highly reliable and accurate signal output (for example, a voice transmission over a speaker).

According to the second form of the present invention as described above, the BTS processor 40 uses the algorithm in interpolator 46 to calculate an interpolation filter based on the auto-correlation function 48 in its memory 44 (which auto-control function can either be selected based on anticipated conditions, or can be chosen by the BTS based on sensed conditions), taking into account the knowledge in the BTS of the power level of the signal 38 in view of the instructions sent by the BTS. That best-suited interpolation filter is then used by the processor 40 to determine improved channel coefficients $C_i$ for all the data symbols. The improved interpolated signal is then demodulated by the demodulator 42 to provide a highly reliable and accurate signal output (for example, a voice transmission over a speaker).

The present invention will be recognized as being particularly advantageous with transceivers 16, 30 having RAKE receivers such as commonly found in CDMA systems. Channel coefficients $C_i$ must be estimated for each RAKE finger in such systems, making accurate channel coefficients $C_i$ particularly important in such systems. However, it should be understood that the present invention could be advantageously used with other types of receivers.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

We claim:

1. A transceiver comprising:
a receiver to receive signals transmitted by another transceiver at known power levels, said received signals having multiple symbols therein including predetermined pilot symbols and non-pilot symbols;
a processor adapted to interpolate channel coefficients for the non-pilot symbols in the received signals based on the known power levels of the received signals; and
a demodulator demodulating the non-pilot symbols in the received signals based on the interpolated channel coefficients.

2. The transceiver of claim 1, wherein: pilot symbol channel coefficients $C_{pi}$ are determined by said processor so as to minimize the following summation for selected pilot symbols:

$$\Sigma E\{|R_{Pi} - C_{Pi}*S_{Pi}*\sqrt{W_{Pi}}|^2\}$$

where: E is an expectation value for the power level at pilot position $P_i$,
$W_{Pi}$ is the known power level at pilot position $P_i$,
$R_{Pi}$ is the pilot symbol as received at pilot position $P_i$, and
$S_{Pj}$ is the pilot symbol known to have been sent at pilot position $P_i$; and
said processor includes an interpolation filter which interpolates channel coefficients for said non-pilot symbols based on said determined pilot symbol channel coefficients $C_{Pi}$.

3. The transceiver of claim 1, wherein said processor calculates an interpolation filter as a function of the known power levels, and channel coefficients for the non-pilot symbols are interpolated using the calculated interpolation filter.

4. The transceiver of claim 3, wherein the processor uses the following auto-correlation function $R_{c'}$ in calculating the interpolation filter:

$$R_{c'|W_i W_k}(i,k) = \sqrt{W_i}\sqrt{W_k} J_O(2\pi f_D(i-k)T_s)$$

where: $J_O$ is a Bessel function of the first kind;
$f_D$ is the Doppler spread of the channel;
$T_s$ is the symbol duration, and
$W_i$ and $W_k$ are known power levels at positions i and k in the received signals.

5. The transceiver of claim 3, wherein the processor uses the following auto-correlation function $R_{c'}$ in calculating the interpolation filter:

$$R_{c'(i,k)|y_1,y_2,\ldots y_L} = E[W_i]E\left[\sqrt{S_1}\right]^{y_1+y_2+\ldots+y_L} J_0(2\pi f_D(i-k)T_s)$$
$$= AE\left[\sqrt{S_1}\right]^{y_1+y_2+\ldots+y_L} J_0(2\pi f_D(i-k)T_s)$$

where: $J_O$ is a Bessel function of the first kind;
$f_D$ is the Doppler spread of the channel;
$T_s$ is the symbol duration;
i and k are positions in the received signals;
$P_i$ is the known power level at position i in the received signals;
$s_1$ is an incremental change in signal power resulting from a non-zero power control bit;
$y_i$ is either 1 or −1, where at position k there have been L incremental power steps;
E is an expectation value for the power level at pilot position $P_i$;
$W_i$ is the known power level at positions i of the received signals; and
A is an average power level of the received signals.

6. The transceiver of claim 3, wherein the processor uses the following auto-correlation function $R_{c'}$ in calculating the interpolation filter:

$$R_{c'}(i,k) = AJ_0(2\pi f_D(i-k)T_s)\left(\frac{\sqrt{S}+\sqrt{S^{-1}}}{2}\right)^L$$

where: $J_O$ is a Bessel function of the first kind;
$f_D$ is the Doppler spread of the channel;

$T_s$ is the symbol duration;

i and k are positions in the received signals;

s is an incremental change $\Delta W_i$ in signal power resulting from a non-zero power control bit;

L is the number of incremental power steps; and

A is an average power level of the received signals.

7. The transceiver of claim 3, wherein the processor uses the following auto-correlation function $R_{c'}$ in calculating the interpolation filter:

$$R_{c'}(i,k) = AJ_0(2\pi f_D(i-k)T_s)\left(\frac{E[\sqrt{s}]+E[\sqrt{s^{-1}}]}{2}\right)^L$$

where: $J_O$ is a Bessel function of the first kind;

$f_D$ is the Doppler spread of the channel;

$T_s$ is the symbol duration;

i and k are positions in the received signals;

s is an incremental change in signal power resulting from a non-zero power control bit;

L is the number of incremental power steps;

E is an expectation value for the power level at pilot position $P_i$; and

A is an average power level of the received signals.

8. The transceiver of claim 1 wherein the processor interpolates channel coefficients for the non-pilot symbols by determining pilot symbol channel coefficients for the pilot symbols based on the known power levels of the received signals; and interpolating channel coefficients for the non-pilot symbols based on the pilot symbol channel coefficients.

9. The transceiver of claim 1 wherein the processor interpolates channel coefficients for the non-pilot symbols by determining pilot symbol channel coefficients for the pilot symbols; and interpolating channel coefficients for the non-pilot symbols based on the pilot symbol channel coefficients and the known power levels of the received signals.

10. The transceiver of claim 9 wherein the processor calculates interpolation filters for the non-pilot symbols in the received signals based on the known power levels of the received signals.

11. A transceiver comprising:

a receiver to receive signals transmitted by another transceiver at known. power levels, said received signals having multiple symbols therein including predetermined pilot symbols and non-pilot symbols;

a processor adapted to:

determine pilot symbol channel coefficients for the predetermined pilot symbols as a function of the known power levels of the received signals, interpolate channel coefficients for non-pilot symbols based on the pilot symbol channel coefficients, and demodulate demodulating the non-pilot symbols based on the interpolated channel coefficients.

12. The transceiver of claim 11, wherein said transceiver is a base station.

13. The transceiver of claim 11, wherein said transceiver is a mobile station.

14. The transceiver of claim 11, wherein the pilot symbol channel coefficients $C_{Pi}$ are determined so as to minimize the following summation for selected pilot symbols:

$$\Sigma E\{|R_{Pi}-C_{Pi}*S_{Pi}*\sqrt{W_{Pi}}|^2\}$$

where: E is the an expectation value for the power level at pilot position $P_i$, $W_{Pi}$ is the known power level at pilot position $P_i$, $R_{Pi}$ is the pilot symbol as received at pilot position $P_i$, and $S_{Pi}$ is the pilot symbol known to have been sent at pilot position $P_i$.

15. The transceiver of claim 11, wherein said processor includes an interpolation filter, and said interpolation filter uses said determined channel coefficients for the pilot symbols to interpolate the channel coefficients for the non-pilot symbols.

16. A transceiver comprising:

a receiver to receive signals transmitted by another transceiver at known power levels, said received signal having multiple symbols therein including predetermined pilot symbols and non-pilot symbols;

a processor adapted to:

calculate pilot symbol channel coefficients for the predetermined pilot symbols in the received signals;

calculate an interpolation filter based on the known power levels of the received signals;

use said calculated interpolation filter and the pilot symbol channel coefficients to interpolate channel coefficients for the non-pilot symbols, and demodulate the non-pilot symbols based on the interpolated channel coefficients.

17. The transceiver of claim 16, wherein the processor uses the following auto-correlation function $R_{c'}$ in calculating the interpolation filter;

$$R_{c|W_iW_k}(i,k)=\sqrt{W_i}\sqrt{W_k}J_O(2\pi f_D(i-k)T_s)$$

where: $J_O$ is a Bessel function of the first kind;

$f_D$ is the Doppler spread of the channel;

$T_s$ is the symbol duration; and $W_i$ and $W_k$ are known power levels at positions i and k in the received signals.

18. The transceiver of claim 16, wherein the processor uses the following auto-correlation function $R_{c'}$ in calculating the interpolation filter:

$$R_{c'(i,k)|y_1,y_2,\ldots y_L} = E[W_i]E[\sqrt{S_1}]^{y_1+y_2+\ldots+y_L}J_0(2\pi f_D(i-k)T_s)$$
$$= AE[\sqrt{S_1}]^{y_1+y_2+\ldots+y_L}J_0(2\pi f_D(i-k)T_s)$$

where: $J_0$ is a Bessel function of the first kind;

$f_D$ is the Doppler spread of the channel;

$T_s$ is the symbol duration;

i and k are positions in the received signals;

$P_i$ is the known power level at position i in the received signals;

$s_1$ is an incremental change in signal power resulting from a non-zero power control bit;

$y_i$ is either 1 or −1, where at position k there have been L incremental power steps;

E is an expectation value for the power level at pilot Position $P_i$;

$W_i$ is the known power level at positions i of the received signals; and

A is the average power level of the received signals.

19. The transceiver of claim 16, wherein the processor uses the following auto-correlation function $R_{c'}$ in calculating the interpolation filter:

$$R_{c'}(i, k) = AJ_0(2\pi f_D(i-k)T_s)\left(\frac{\sqrt{S}+\sqrt{S^{-1}}}{2}\right)^L$$

where: $J_O$ is a Bessel function of the first kind;
$f_D$ is the Doppler spread of the channel;
$T_s$ is the symbol duration;
i and k are positions in the received signals;
s is an incremental change $\Delta W_i$ in signal power resulting from a non-zero power control bit;
L is the number of incremental power steps; and
A is the average power level of the received signals.

20. The transceiver of claim 16, wherein the processor uses the following auto-correlation function $R_{c'}$ in calculating the interpolation filter:

$$R_{c'}(i, k) = AJ_0(2\pi f_D(i-k)T_s)\left(\frac{E[\sqrt{S}]+E[\sqrt{S^{-1}}]}{2}\right)^L$$

where: $J_O$ is a Bessel function of the first kind;
$f_D$ is the Doppler spread of the channel;
$T_s$ is the symbol duration;
i and k are positions in the received signals;
s is an incremental change in signal power resulting from a non-zero power control bit;
L is the number of incremental power steps;
E is an expectation value for the power level at pilot position $P_i$; and
A is an average power level of the received signals.

21. A method of receiving signals comprising:
receiving signals transmitted at known power levels, said received signals having multiple symbols including predetermined pilot symbols and non-pilot symbols;
interpolating channel coefficients for the non-pilot symbols based on the known power levels of the received signals;
demodulating the non-pilot symbols based on the interpolated channel coefficients.

22. The method of claim 21 wherein interpolating channel coefficients for the non-pilot symbols based on the known power levels of the received signals comprises:
determining pilot symbol channel coefficients for the pilot symbols based on the known power levels of the received signals; and
interpolating channel coefficients for the non-pilot symbols based on the pilot symbol channel coefficients.

23. The method of claim 21 wherein interpolating channel coefficients for the non-pilot symbols based on the known power levels of the received signals comprises:
determining pilot symbol channel coefficients for the pilot symbols; and
interpolating channel coefficients for the non-pilot symbols based on the pilot symbol channel coefficients and the known power levels of the received signals.

24. The method of claim 23 wherein interpolating channel coefficients for the non-pilot symbols based on the pilot symbol channel coefficients and the known power levels of the received signals comprises determining interpolation filters based on the known power levels of the received signals.

25. The method of claim 24 wherein determining interpolation filters based on the known power levels of the received signals comprises calculating the interpolation filter based on an auto correlation function.

26. The method of claim 22 wherein determining pilot symbol channel estimates comprises minimizing the following summation for selected pilot symbols:

$$\Sigma E\{|R_{Pi}-C_{Pi}*S_{Pi}*\sqrt{W_{Pi}}|^2\}$$

where: E is an expectation value for the power level at pilot position $P_i$,
$W_{Pi}$ is the known power level at pilot position $P_i$,
$R_{Pi}$ is the pilot symbol as received at pilot position $P_i$, and
$S_{Pi}$ is the pilot symbol known to have been sent at pilot position $P_i$.

* * * * *